United States Patent

[11] 3,564,113

[72] Inventor Georg Kindler
 Bremen-Vegesack, Germany
[21] Appl. No. 811,888
[22] Filed Apr. 1, 1969
[45] Patented Feb. 16, 1971
[73] Assignee Vereinigte Flugtechnische Werke
 Gesellschaft mit beschrankter Haftung
 fruher "Weser" Flugzeugbau/Focke-Wolf
 Heinkel-Flugzeugbau
 Bremen, Germany
[32] Priority April 10, 1968
[33] Germany
[31] P 17 50 240.8

[54] PASSAGE MEANS FOR PASSING PIPES, CABLES AND THE LIKE THROUGH WALLS
 7 Claims, 6 Drawing Figs.
[52] U.S. Cl.................................................. 174/65;
 16/2; 174/153; 174/156; 248/56; 285/137; 285/159
[51] Int. Cl....................................................... F16l 5/00,
 H02g 3/22
[50] Field of Search............................................ 174/40.1,
 65G, 135, 152.2, 153G, 155, 156, 157; 16/2;
 248/56, 67.5, 68, 68 (C.B.); 285/137, 158, 159,
 162, (Snap Fit Digest)

[56] References Cited
UNITED STATES PATENTS
2,420,826 5/1947 Irrgang.......................... 174/153(G)
2,922,836 1/1960 Brown........................... 174/153(G)
3,162,412 12/1964 McEntire..................... 174/153(G)X Primary Examiner—Laramie E. Askin
Assistant Examiner—1
Attorney—Walter Becker ABSTRACT: A holding structure for holding and passing conduit means and conductors, especially pipes and electric cables, through a passage in a wall, which includes at least two holding sections having circumferential groove means for fitting a wall provided with passage means through which the conduit means and conductors are to be passed, said holding sections being adapted to receive the conduit means and conductors to be passed through the wall, while compressible elastic means are provided between said holding sections for firmly engaging and holding and conduit means and conductors in said holding sections.

PATENTED FEB 16 1971

3,564,113

Inventor:
Georg Kindler
By
Walter Becker

PASSAGE MEANS FOR PASSING PIPES, CABLES AND THE LIKE THROUGH WALLS

The present invention relates to means for passing pipes, electric cables or the like through walls, especially of vehicles.

When mounting pipes and cables in vehicles, at the areas where such pipes or cables are passed through walls, difficulties are encountered in view of the partitions and spars, ribs and the like concerning the connecting and mounting of such pipes and cables. For purposes of overcoming these difficulties, it is known to place a rubber sleeve or a sleeve of synthetic material under tension upon the respective pipe, electric cable or the like while such sleeves have an outer contour corresponding to the respective passage through the wall. These sleeves of rubber of synthetic material are then, together with the respective cable or the like, introduced into said passage means. The sleeve of rubber or synthetic material which is closed all the way around is provided with an annular groove engaged by the wall containing the passage means so that the pipes, electric cables or the like will be fastened in the passage means and held therein. In addition thereto, frequently clamping rings are mounted on the sleeve of rubber or synthetic material or in the annular groove, which rings exert an increased pressure upon the wall with the passage means therethrough.

This way of passing through a wall is not suitable for fastening and holding a plurality of adjacent pipes, electric cables or the like, inasmuch as each of these cables or the like requires such passage means through the wall and consequently respective separate passage means through the wall are necessary.

Furthermore, the said sleeves are to be slipped onto the corresponding pipe, electric cable or the like prior to mounting the respective pipe, electric cable, etc. and have to be advanced to the place where it is required. With conduits of greater length, the mounting of the sleeves is therefore rather cumbersome, and when conduits are involved which are already at their ends provided with connecting sleeves or other fittings, the said sleeve arrangements for passing a pipe or cable through the wall cannot be used at all. With the above-mentioned way of passing pipes, cables or the like through a wall, it is necessary to employ additional connecting elements when electric mass connections are required.

It is, therefore, an object of the present invention to provide means for passing pipes, electric cables or the like through walls, especially of vehicles, which will overcome the above-mentioned drawbacks.

It is another object of this invention to provide means of the type set forth in the preceding paragraph which, while employing only a few mounting elements, will be able to permit a simple and fast mounting, even of a plurality of adjacent pipes, electric cables or the like even though they might have their ends already provided with connecting fittings.

It is still another object of this invention to provide means for passing pipes, cables or the like through a wall with a single passage through the wall while, if necessary, also a direct electric mass connection will be possible.

Still another object of this invention consists in the provision of an arrangement as set forth in the preceding paragraphs, which will make it possible to mount the arrangement of the invention also when conduits have already been installed while a minimum space will be required by the arrangement according to the invention and the installation of the devices according to the invention will also be possible at areas and narrow wall zones which are difficult to get to.

These and other objects and advantages of the invention will appear more clearly from the following specification in connection with the accompanying drawing, in which.

The arrangement according to the present invention is characterized primarily in that at least two formed parts are provided which surround the pipes, electric cables or the like at at least two sides while forming a circular engaging surface which snugly engages the contour of a passage through a wall. These parts are provided with wall-shaped elevations arranged on both sides of said engaging surface for arresting the arrangement within said passage. The said formed parts are by means of an elastic intermediate member arranged between said formed parts pressed against the inner wall of the passage while simultaneously the pipes, electric cables or the like are fixed relative to the formed parts.

In order to permit an easy assembly, the wall-shaped elevations which delimit the engaging surface of the formed parts have different heights. The higher one of said wall-shaped elevations serves as means for limiting the insertion of the formed parts.

It is furthermore suggested according to the invention that one wall-shaped elevation and/or the other elevation does not extend all the way through so that the formed parts will be able easier to engage and be locked in the passage means.

In order to allow the employment of the means according to the invention also for different wall thicknesses, it is suggested in conformity with a further development of the invention that the width of the engaging surface of the formed parts is variable by intermediate layers of different strength which engage at least one of the wall-shaped elevations.

It is furthermore suggested in conformity with the invention that at least one of the formed parts have receiving slots for the pipes, electric cables or the like which are so dimensioned that a fixing of the pipes, electric cables or the like is effected by the elastic intermediate member.

In order to simplify the keeping of stock of passage means to be passed through a wall for the individual components of cables or conduits, and in order to permit a diversified employment, the receiving slots are formed in the formed parts by exchangeable inserts. In order, if desired, to establish a direct electric mass connection between, for instance, one pipe and one wall passage means without requiring additional connecting elements, the formed parts preferably consist of an electrically conductive material.

Figure 1:
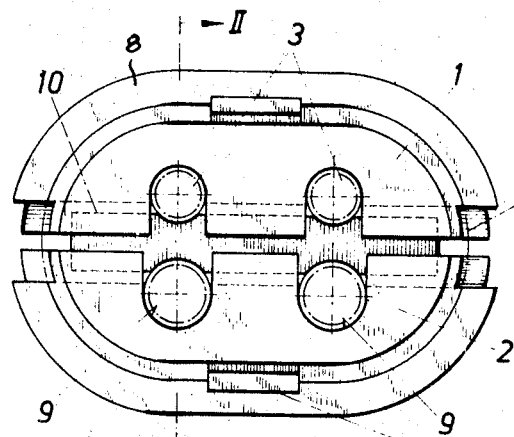
FIG. 1 shows a view of an arrangement according to the invention for passing pipes, cables or the like through a wall while each formed part has receiving slots for pipes.
Figure 2:
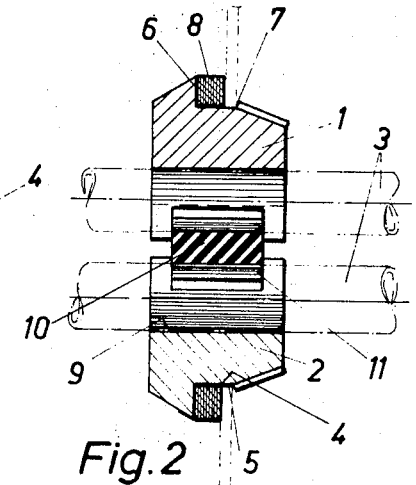
FIG. 2 is a section along the line II–II of FIG. 1.

Referring now to the drawings in detail and FIGS. 1 and 2 thereof in particular, these figures show an arrangement for passing through a wall which comprises two approximately equal formed parts 1 and 2. The formed parts 1 and 2 surround a plurality of pipes 3 from two sides and have a circular engaging area 5 which adapts itself to the contour of the wall breakthrough 4. This engaging area or surface 5 is at both sides provided with wall-shaped elevations 6 and 7 for arresting the formed parts 1 and 2 within the breakthrough 4. The wall-shaped elevation 7 is in this embodiment provided only over a short distance.

The wall-shaped elevations 6 and 7 have different heights while the elevation 6 having the greater height serves for limiting the insertion during the assembly. The width of the engaging surface 5 may, by intermediate layers 8 of variable thickness, be adapted to the various wall thicknesses of the breakthrough. These intermediate layers 8 engage the elevation 6 and may for instance consist of superimposed metal foils.

On the inside of the formed parts 1 and 2 there are respectively arranged two receiving slots 9 for the pipes 3. Between the two parts 1 and 2 there is furthermore provided an elastic intermediate member 10 which is held in the respective recesses in the parts 1 and 2.

The assembly is effected in the following manner. The pipes 3 are guided or passed through the breakthrough 4 while the pipes may have previously been equipped with sleeve connections or fittings. Thereupon, the elastic intermediate member 10 is, ahead of the breakthrough, introduced between the lower and the upper pipes 3. Thereupon, the two formed parts 1 and 2 are mounted which surround the pipes 3 and the elastic intermediate member 10. The parts 1 and 2 as well as the intermediate member 10 are together pressed into the breakthrough 4 in the direction of the axes of the pipes until the parts 1 and 2 engage and lock with the breakthrough 4 by means of the elevations 6 and 7 in the passage 4 which delimit the engaging surface 5. In this position, through the intervention of the elastic intermediate member 10 while simultaneously fixing the pipes 3, the formed parts 1 and 2 are pressed against the inner wall of the passage 4. In this way, the pipes 3 are connected in the passage 4 and held therein.

Figure 3:
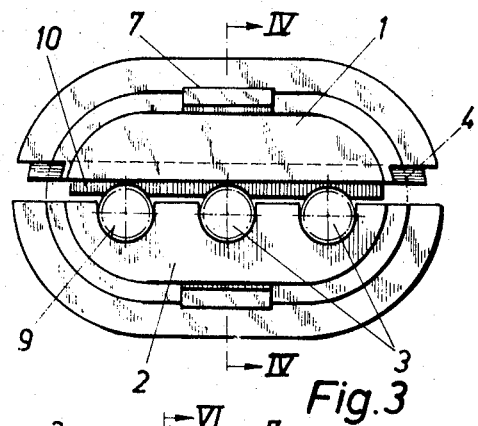
FIG. 3 shows the arrangement according to the invention in view while only one part has receiving slots for pipes.
Figure 4:
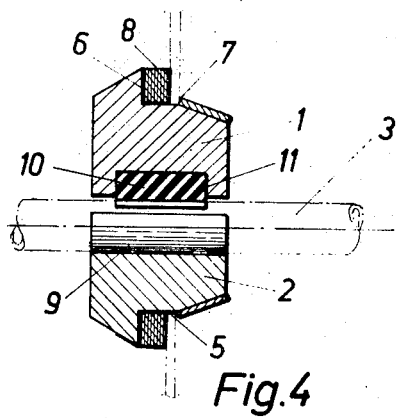
FIG. 4 is a section along the line IV–IV of FIG. 3.

FIGS. 3 and 4 illustrate a further embodiment for a wall breakthrough according to the invention which differs from the previous embodiment of FIGS. 1 and 2 only slightly. With the embodiment of FIGS. 3 and 4, only the formed part 2 is equipped with receiving slots 9 for the pipe 3. The elastic intermediate member 10 may with this design be firmly connected to the part 1 so that such wall part comprises a total of only two building elements.

Figure 5:
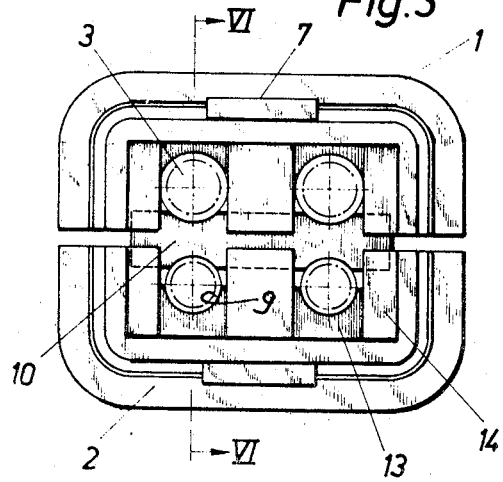
FIG. 5 is a view of means according to the invention for passing pipes, cables or the like through a wall, said means being built up of individual building elements only.
Figure 6:
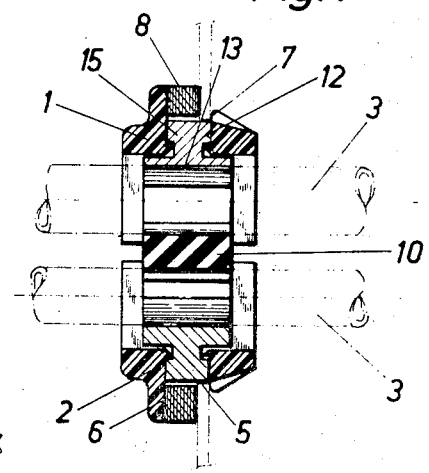
FIG. 6 is a section along the line VI–VI of FIG. 5.

The further embodiment shown in FIGS. 5 and 6 serves to provide a wall breakthrough for the combination of conduits of different diameter. The wall breakthrough is composed of individual exchangeable building elements. These parts 1 and 2 which in this instance merely serve as frame have receiving openings 12 for individual inserts and spacer members 14. The inserts 13 and spacer members 14 through a fitting stud 15 engage the receiving openings 12 and together form the receiving slots 9 for the pipes 3. Thus, this wall breakthrough arrangement furnishes the possibility as a preassembly to adapt itself to the respective prevailing conditions. The final assembly is effected in the manner described above in connection with the preceding embodiments.

The design of the wall breakthrough arrangement from individual building elements also permits the employment of different materials. Thus, for instance, the inserts 13 may consist of an electrically conductive material and after the assembly are adapted to establish simultaneously an electric mass connection between the pipes 3 and the wall of the breakthrough.

It is, of course, to be understood that the present invention is, by no means, limited to the particular constructions shown in the drawing but also comprises any modifications within the scope of the appended claims.

I claim:

1. A holding structure for holding and passing conduit means and conductors, especially pipes and electric cables, through a passage in a wall, which includes: at least two holding sections complementary to each other so as together to form a circumferential surface portion fitting into the wall passage through which conduit means and conductors are to be passed, said circumferential surface portion being defined laterally by circumferentially oppositely located elevations on said holding sections, at least one of said holding sections having recess means for receiving conduit means and conductors to be passed through a wall passage, and compressible elastic means interposed between said sections tightly pressed thereby and adapted elastically both to engage and also hold conduit means and conductors in said recess means.

2. A holding structure according to claim 1, in which said oppositely located elevations have different outer diameters.

3. A holding structure according to claim 1, in which said elevations are limited to extend over portions only of the circumference of said two holding sections.

4. A holding structure according to claim 1, in which said holding sections consist specifically of an electrically conductive material.

5. A holding structure according to claim 1, in which said recess means are so dimensioned that by the said elastic means the conduit means and conductors inserted therein will be firmly held therein irrespective of differing diameters.

6. A holding structure for holding and passing conduit means and conductors, especially pipes and electric cables, through a passage in a wall, which includes: two pairs of holding sections together forming a frame, two insert members respectively inserted into said pairs of holding members and having their outer circumference together with the adjacent outer circumferential portions of the pairs of holding sections pertaining thereto form a circumferential groove for receiving a wall portion defining a passage, and compressible elastic means interposed between said inserts, said inserts being adapted to receive conduit means and conductors to be passed through a passage in a wall, said compressible elastic means being adapted both to engage conduit means and conductors received in said inserts also to firmly hold the same therein.

7. A holding structure according to claim 6, in which said inserts consist specifically of an electrically conductive material.